United States Patent
Wehrfritz

(10) Patent No.: US 7,155,826 B2
(45) Date of Patent: Jan. 2, 2007

(54) MOTOR SPINDLE WITH IMPROVED MACHINING PRECISION AND METHOD FOR OPERATING ONE SUCH MOTOR SPINDLE

(75) Inventor: Heinz Wehrfritz, Kalchreuth (DE)

(73) Assignee: Paul Müller GmbH & Co. KG Unternehmensbeteiligungen, Ahlen (DE)

( * ) Notice: Subject to any disclaimer, the term of this patent is extended or adjusted under 35 U.S.C. 154(b) by 224 days.

(21) Appl. No.: 10/478,021

(22) PCT Filed: May 8, 2002

(86) PCT No.: PCT/DE02/01662

§ 371 (c)(1),
(2), (4) Date: Nov. 14, 2003

(87) PCT Pub. No.: WO02/092277

PCT Pub. Date: Nov. 21, 2002

(65) Prior Publication Data

US 2004/0208720 A1    Oct. 21, 2004

(30) Foreign Application Priority Data

May 15, 2001  (DE)  ................. 101 23 717
Dec. 20, 2001 (DE)  ................. 101 63 089

(51) Int. Cl.
*B23P 15/00* (2006.01)
*B23C 1/00* (2006.01)
(52) U.S. Cl. .............. 29/898.09; 29/898.07; 409/131; 409/231; 409/187; 409/214; 409/218; 408/239 R; 384/557; 384/556; 384/519; 384/448

(58) Field of Classification Search ........ 409/231–233, 409/186–188, 193–196, 207–208, 210, 214, 409/218, 131–132; 408/239 R, 238, 240, 408/239 A; 29/898.07, 898.09; 384/557, 384/556, 519, 517, 448

See application file for complete search history.

(56) References Cited

U.S. PATENT DOCUMENTS 3,664,718 A * 5/1972 Uhtenwoldt ................. 384/101
3,943,803 A * 3/1976 Hafla ........................ 384/563

(Continued)

FOREIGN PATENT DOCUMENTS

DE         3143344 A1 * 5/1983

(Continued)

*Primary Examiner*—Erica Cadugan
(74) *Attorney, Agent, or Firm*—Collard & Roe, P.C.

(57) ABSTRACT

A motor spindle includes a spindle shaft for receiving a tool. The spindle shaft is accommodated in the housing of the motor spindle in a fixed bearing and a loose bearing. The received tool enters into contact with the machined workpiece in a tool interface when the spindle shaft is driven and the tool interface is displaced in an axial direction of the spindle shaft when a workpiece is machined. A displacement sensor is provided on the spindle bearing in order to determine the axial displacement of the tool interface. There is also a motor spindle including a spindle shaft for receiving a tool. The spindle shaft is accommodated in the housing of the motor spindle in a fixed bearing and in a loose bearing with an axially displaceable bearing bushing. The tool enters into contact with the machined workpiece at the tool interface when the spindle shaft is driven, and an adjusting element which is used to adjust the axial displacement of the bearing bushing of the motor spindle is also provided.

7 Claims, 4 Drawing Sheets

U.S. PATENT DOCUMENTS

Figure 1:
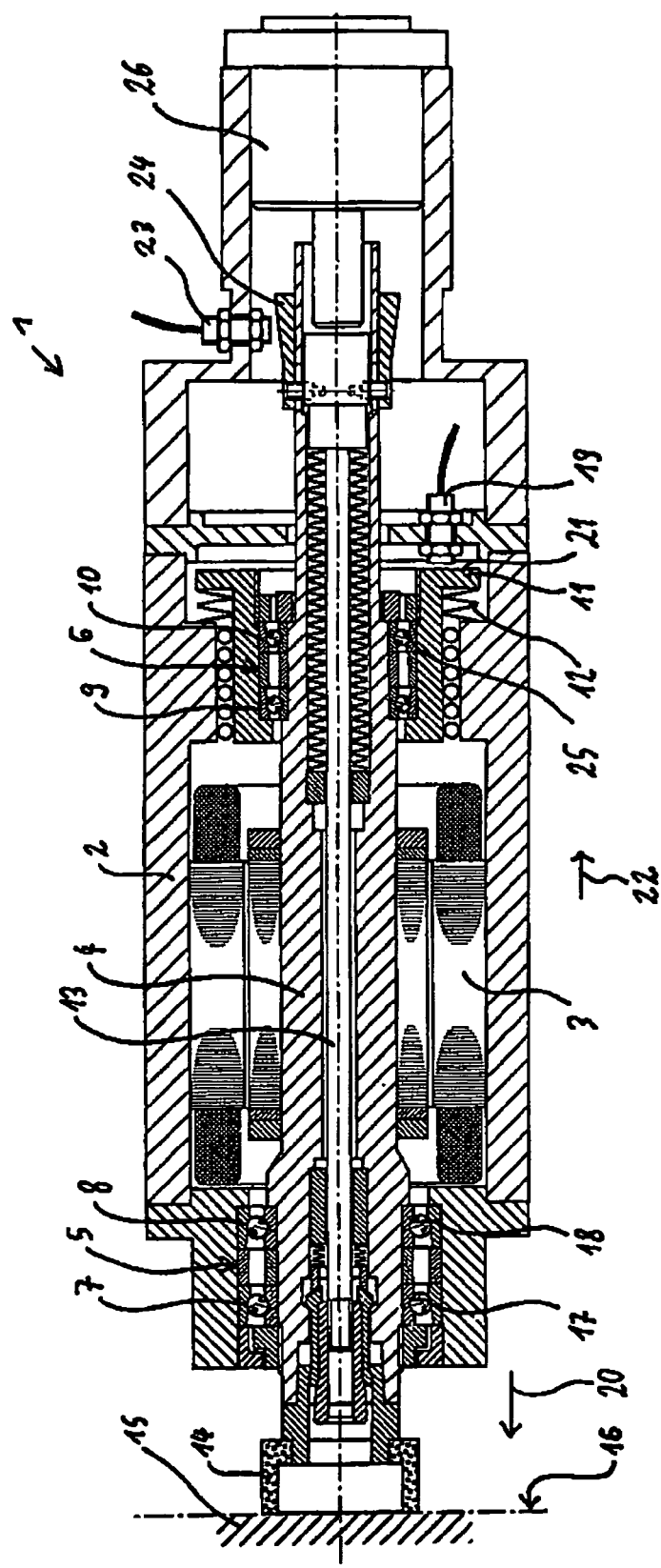

| | | | | |
|---|---|---|---|---|
| 4,329,771 | A | * | 5/1982 | Eto et al. ................ 483/4 |
| 4,657,412 | A | * | 4/1987 | McLarty et al. ............ 384/517 |
| 4,657,451 | A | * | 4/1987 | Tanaka ................ 409/186 |
| 5,051,005 | A | * | 9/1991 | Duncan ................ 384/517 |
| RE34,623 | E | * | 5/1994 | Briggs ................ 408/158 |
| 5,620,260 | A | * | 4/1997 | Ide ................ 384/122 |
| 6,464,435 | B1 | * | 10/2002 | Chen ................ 409/231 |
| 6,505,972 | B1 | * | 1/2003 | Harbottle et al. ........... 384/517 |
| 2002/0076127 | A1 | * | 6/2002 | Wu et al. ................ 384/517 |

FOREIGN PATENT DOCUMENTS

| | | | |
|---|---|---|---|
| DE | 196 29 991 | | 1/1998 |
| EP | 0 343 517 | | 11/1989 |
| EP | 1 066 917 | | 1/2001 |
| JP | 10-244440 | | 9/1998 |
| JP | 2000-84702 | A * | 3/2000 |

* cited by examiner

MOTOR SPINDLE WITH IMPROVED MACHINING PRECISION AND METHOD FOR OPERATING ONE SUCH MOTOR SPINDLE

CROSS REFERENCE TO RELATED APPLICATIONS

Applicant claims priority under 35 U.S.C. §119 of German Application Nos. 101 23 717.0, filed May 15, 2001 and 101 63 089.1, filed Dec. 20, 2001. This application is the national stage, filed under 35 U.S.C. §371, of PCT/DE02/01662 filed May 8, 2002. The international application under PCT article 21(2) was not published in English.

The invention relates to a motor spindle with improved machining precision and to a method for operating such a motor spindle.

In a first implementation, the invention relates, on the one hand, to a motor spindle with a spindle shaft for receiving a tool and with other features of the invention. Furthermore, the invention relates, in the first implementation, to a method for displacing a motor spindle.

Motor spindles with a fixed mounting and a loose mounting, which are used for the machining of workpieces at high rotational speeds, are known as prior art with regard to the first implementation. The workpiece machining precision is impaired by an undesirable axial movement of the tool interface when the spindle shaft rotates.

The object on which the first implementation of the invention is based is to offer a motor spindle and a method for displacing a motor spindle, in which the workpiece machining precision is improved.

This object is achieved, for the motor spindle, by means of the features of the present invention. Advantageous embodiments of the motor spindle are also described. The object is achieved, for the method, by means of the features of the present invention. Advantageous method variants are also described in the present invention.

In the motor spindle according to the invention in accordance with the first implementation, a travel sensor is provided on the spindle mounting in order to determine the axial displacement of the tool interface. Since the undesirable axial displacement is determined via the travel sensor, the axial displacement can be compensated via a compensating feed movement which involves the entire motor spindle. Workpiece machining can thereby take place with markedly improved precision.

In an advantageous embodiment, the travel sensor may be provided for detecting the axial position of the loose mounting. By attaching the travel sensor in this way, a marked distance from the machined workpiece and from the machining tool is provided. Furthermore, the axial displacement of the spindle shaft can be measured particularly reliably on a stationary part.

According to a further advantageous embodiment, the travel sensor can detect the axial displacement of the spindle shaft at an outer ring of the loose mounting. In a further advantageous embodiment, the travel sensor can detect the axial position of the bearing bush of an outer ring of the loose mounting, in which case the travel sensor can be attached to a particularly accessible region of the motor spindle.

In a further embodiment, the travel sensor can be designed as a touch-contact sensor with direct contact, for example, with the loose mounting, its outer ring or its bearing bush. The transmission faults possibly occurring in the case of contactless travel sensors can consequently be avoided.

According to a further embodiment, the travel sensor may also be designed as a contactless sensor, for example as an inductive, capacitive, optical or eddy-current sensor. Direct contact is thereby avoided with the reference surface, to be measured, of the loose mounting, of the outer ring or of the bearing bush, with the result that a wear of the travel sensor and measurement errors resulting from this are avoided.

The data read out from the travel sensor and relating to the axial displacement of the spindle shaft are advantageously transfered to a control element, for example in order to activate a feed of the entire motor spindle for the purpose of compensating the axial displacement.

By means of a feed element of this kind, the motor spindle can be displaced axially in the direction of the workpiece, in order, during operation, to correct and compensate the axial displacement which is determined. For this purpose, the control element is preferably connected to the feed element of the motor spindle for data exchange.

In the method according to the invention for the first implementation of the invention for displacing a motor spindle with a spindle shaft, compensation of the determined axial displacement of the tool interface takes place. Machining precision is thereby increased. The undesirable axial displacement of the spindle shaft, determined via a travel sensor, is compensated in the opposite direction by means of a corresponding feed movement of the entire motor spindle.

According to a further advantageous method variant, one or more functional relations between a variation induced by rotational speed and/or by temperature and the determined axial displacement of the spindle shaft may be used as a command variable for compensating the determined axial displacement.

If an abrupt and considerable axial displacement occurs at the travel sensor for determining the undesirable axial displacement of the spindle shaft, this can be processed as a fault message.

For receiving the tools, motor spindles conventionally possess chucking systems which have, for example, an axial tie rod which can be displaced in the axial direction in the spindle shaft designed as a hollow shaft. To act upon a tie rod of this type with force, a piston element is conventionally provided, via which the tie rod can be displaced in the direction of the front-side chucking system, as a result of which a tool received in the chucking system can be removed and a new tool inserted. During the retraction of the piston element, the tie rod is conventionally reset by means of integrated spring elements.

In the event of the occurrence of an undesirable axial displacement of the tool interface, the position of the tie rod of the chucking system is also varied. The axial displacement of the tool interface, said axial displacement being detected by the travel sensor, can be used to correct the data of a further travel sensor for determining the position of the tie rod.

In a further advantageous method variant, when the motor spindle is started up, a reset run can be carried out at the lowest possible rotational speed, with the result that bearing bodies in the fixed or the loose mounting which are possibly jammed due to previous cooling are loosened, with the result that a reference point for the travel sensor for determining the undesirable axial displacement of the tool interface can be determined before the actual axial displacement is detected.

The first implementation of the invention is explained in more detail by means of an exemplary embodiment in the drawing FIG. 1 (motor spindle in longitudinal section).

FIG. 1 shows a motor spindle 1 in longitudinal section, with a spindle housing 2 and with a drive 3 for a spindle shaft 4 which is received in the spindle housing 2 via a fixed mounting 5 and a loose mounting 6. The fixed mounting 5 and the loose mounting 6 have in each case bearing elements 7, 8 and 9, 10 which may be designed, for example, as spindle bearings. When spindle bearings are used, there is between the balls and the running tracks of the spindle bearings a contact angle of approximately between 12° and 25°.

The fixed mounting 5 and the loose mounting 6 are prestressed relative to one another via a force-loaded bearing bush 11. The action of force on the bearing bush 11 may take place by means of a spring element 12, hydraulically and/or pneumatically.

The spindle shaft 4 is a hollow shaft and receives inside it a tie rod 13 of a chucking system of the motor spindle 1 for receiving the tool 14 (for example, a cup-type grinding wheel). The tool 14 contacts the workpiece 15 (for example, a silicon surface), the tool interface 16 being located in the contact region between tool 14 and workpiece 15.

When the motor spindle 1 is in operation, with the spindle shaft 4 rotating, a kinematic displacement of the spindle shaft 4 occurs on account of the centrifugal forces acting on the bearing bodies 17, 18 of the bearing elements 7, 8 of the fixed mounting 5. Furthermore, due to the heating of the spindle shaft 4, a thermal displacement of the spindle shaft 4 in the axial direction occurs, starting from the bearing elements 7, 8 and the drive 3.

By means of the travel sensor 19 according to the invention, an undesirable displacement of the spindle shaft 4 in the displacement direction 20 is determined by a measurement of the distance between the travel sensor 19 and a reference surface 21 of the bearing bush 11 or an outer ring 25 of, for example, the bearing element 10 of the loose mounting 6. Via the approach of the reference surface 21 to the travel sensor 19 determined by the travel sensor 19, the entire motor spindle 1 can be displaced in the opposite direction 22, via a feed element known per se, so as to compensate the determined axial displacement of the spindle shaft 4, so that, after compensation has taken place successfully, no displacement of the tool interface 16 occurs.

In the event that an axial displacement of the spindle shaft 4 in the displacement direction 20 is detected by the travel sensor 19, a displacement of the tie rod 13, received in the spindle shaft 4 and actuated by the piston element 26, in the displacement direction 20 also occurs, with the result that the position of the tie rod 13, detected by a further travel sensor 23 by measurement of the distance from a further reference surface 24, is determined incorrectly. By means of the axial displacement determined by the travel sensor 19, the position indication of the second travel sensor 23 can be corrected and amended, for example by differentiation, in a control element (for example a processor), not illustrated, which is connected to the travel sensors 19 and 23. As a result, the position of the tie rod 13 and consequently also the states of the chucking system (tool chucked, tool released, tool incorrectly chucked, tool absent) can be detected more accurately.

In a second implementation, the invention relates to a motor spindle with a spindle shaft for receiving a tool, said motor spindle having the further features of the present invention. Furthermore, in the second implementation, the invention relates to a method for setting the axial displaceability of the bearing bush of the loose mounting of a motor spindle with a spindle shaft.

A motor spindle with tools, which is used for the machining of workpieces, in particular with an automated tool or workpiece change, is known as prior art, in relation to the second implementation, from German patent application file number 10123717.0 (Applicant: Paul Müller GmbH & Co. KG Unternehmensbeteiligungen). The shaft of a motor spindle of this kind may possess a fixed mounting and a loose mounting, in which case the loose mounting may be received in an axially displaceable bearing bush.

The object on which the invention is based, in the second implementation, is to offer a motor spindle and a method in which the mounting can be adapted to different operating conditions.

This object is achieved, for the motor spindle, by means of the features of the present invention. Advantageous embodiments of the motor spindle are also described. The object is described, for the method, by means of the features of the present invention. Advantageous method variants are also described.

The motor spindle according to the invention in accordance with the second implementation of the invention possesses an actuating element for setting the axial displaceability of the bearing bush and consequently the rigidity of the motor spindle. The rigidity of a motor spindle is a measure of the load-bearing capacity with respect to reaction forces of the motor spindle which occur during workpiece machining. In general, in the machining of the workpiece, increased rigidity is desirable in order to achieve low machining tolerances. When the motor spindle is moved up in rapid motion, for example after a tool change has taken place, and the workpiece is contacted by the tool, a reduced rigidity may be desirable in order to damp the contact bump between tool and workpiece. According to the invention, the actuating element serves in each case for the favorable setting of the rigidity as a function of the operating state of the motor spindle.

In a first embodiment, the actuating element may have a piston, in which case a cylinder for actuating the piston may be provided. In this case, the actuating element can act on the mounting of the motor spindle, in particular on the loose mounting, and, in order to increase the rigidity (prestress), introduce to the motor spindle a counterforce which acts in the axial direction of the shaft. When an increased counterforce is introduced, the rigidity of the spindle shaft is increased, and, when a reduced counterforce is introduced, the rigidity is reduced, as may be advantageous, for example, with regard to the change of workpiece.

According to a further advantageous embodiment, the actuating element may have an expandable annular element which may likewise be attached in the region of the loose mounting of the motor spindle. When a bearing bush known per se is used in order to form the loose mounting, the axial moveability of the bearing bush may be varied by means of frictional forces of the annular element. Depending on the degree of expansion, the annular element can generate increased or reduced frictional forces which make the axial movement of the bearing bush easier or more difficult, with the result that the axial rigidity (prestress) of the motor spindle is reduced or increased.

The actuating element can be actuated in a way known per se, that is to say, for example, pneumatically or hydraulically.

In order to reduce the ancillary times during the tool or workpiece change, the feed of the motor spindle and the movements of the latter which are related to the workpiece change are executed in rapid motion at increased speed.

When the tool and workpiece are in engagement again, a work motion with reduced feed speed must be set.

According to the invention, then, the aim is to carry out as large a proportion as possible of the ancillary times during the workpiece change in rapid motion and to change over again to work motion with a reduced feed speed only at as late a time as possible.

For this purpose, the motor spindle advantageously possesses a travel sensor for determining the time of contacting of the tool with the workpiece. After a tool or workpiece change has taken place, the tool and the workpiece are moved up to one another, specifically in rapid motion. Only when the travel sensor according to the invention detects a bump-like change in travel of the shaft and consequently of the bearing bush does the motor spindle detect that the tool has contacted the workpiece, and there is a changeover from rapid motion with an increased feed speed to work motion with a lower feed speed for the purpose of machining the workpiece. The travel sensor consequently makes it possible to determine the changeover time from rapid motion to work motion. Too early a changeover from rapid motion to work motion and an associated undesirable increase in the ancillary times are avoided.

Advantageously, a feed element known per se, which serves for orientation and for feed movement (toward and away from the workpiece), is used. In this feed element, at least one rapid motion for the accelerated movement of the tool with respect to the workpiece and at least one work motion for the slowed movement of the tool with respect to the workpiece can be set.

In the method according to the invention for setting the axial displaceability of the bearing bush of the loose mounting of a motor spindle with a spindle shaft, the axial displaceability of the bearing bush of the motor spindle in order to adapt to different operating conditions is set via an actuating element.

According to an advantageous method variant, during the tool change, the time of contacting of the tool with the workpiece is detected via a travel sensor, and, in this case, there is a changeover from rapid motion with an increased feed speed to work motion with a reduced feed speed.

To control the feed movement of the tool, during the tool change the time of contacting of the tool with the workpiece is detected via a travel sensor, and, in this case, there is a changeover from rapid motion with an increased feed speed (set after the workpiece change) to work motion with a reduced feed speed. The time of changeover from rapid feed to work feed is determined by means of the travel sensor, so that too early a changeover and consequently an undesirable increase in the ancillary times during the tool change are avoided. Advantageously, when the (new) tool is moved up to the workpiece to be machined, the rigidity of the spindle shaft of the motor spindle is reduced, in order to allow careful contacting of the workpiece by the tool. After the contacting of tool and workpiece has taken place, the rigidity can be increased again for the purpose of reducing machining tolerances during the machining of the workpiece.

According to the invention, furthermore, it is proposed to use a travel sensor known per se in a machine spindle described for detecting the time of the contacting of the tool with the workpiece, in order, during contacting, to change over from rapid motion with an increased feed speed (set during the already described tool or workpiece change) to work motion with a reduced feed speed.

The first implementation of the invention is explained in more detail by means of an exemplary embodiment in the drawing FIG. 1 (motor spindle in longitudinal section).

Figure 2:
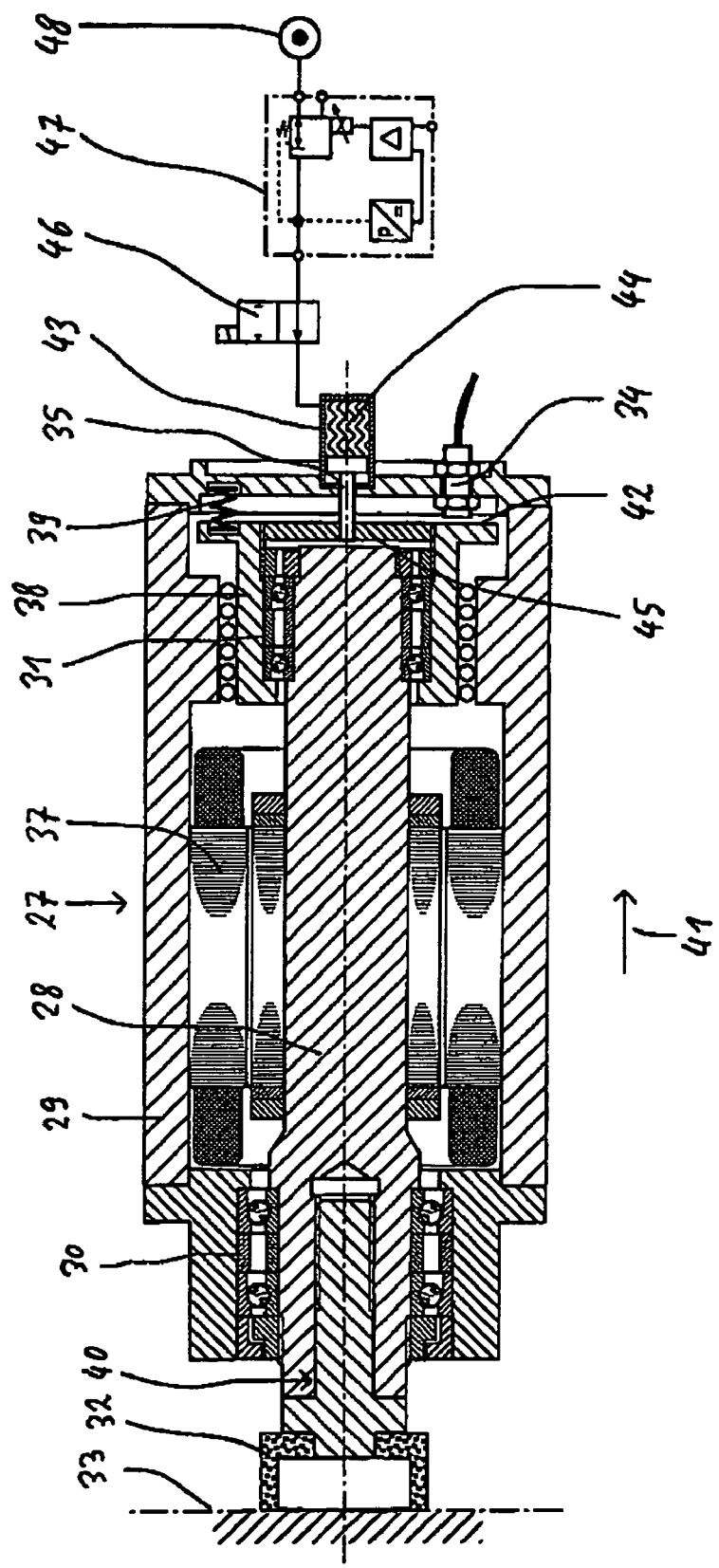
Figure 3:
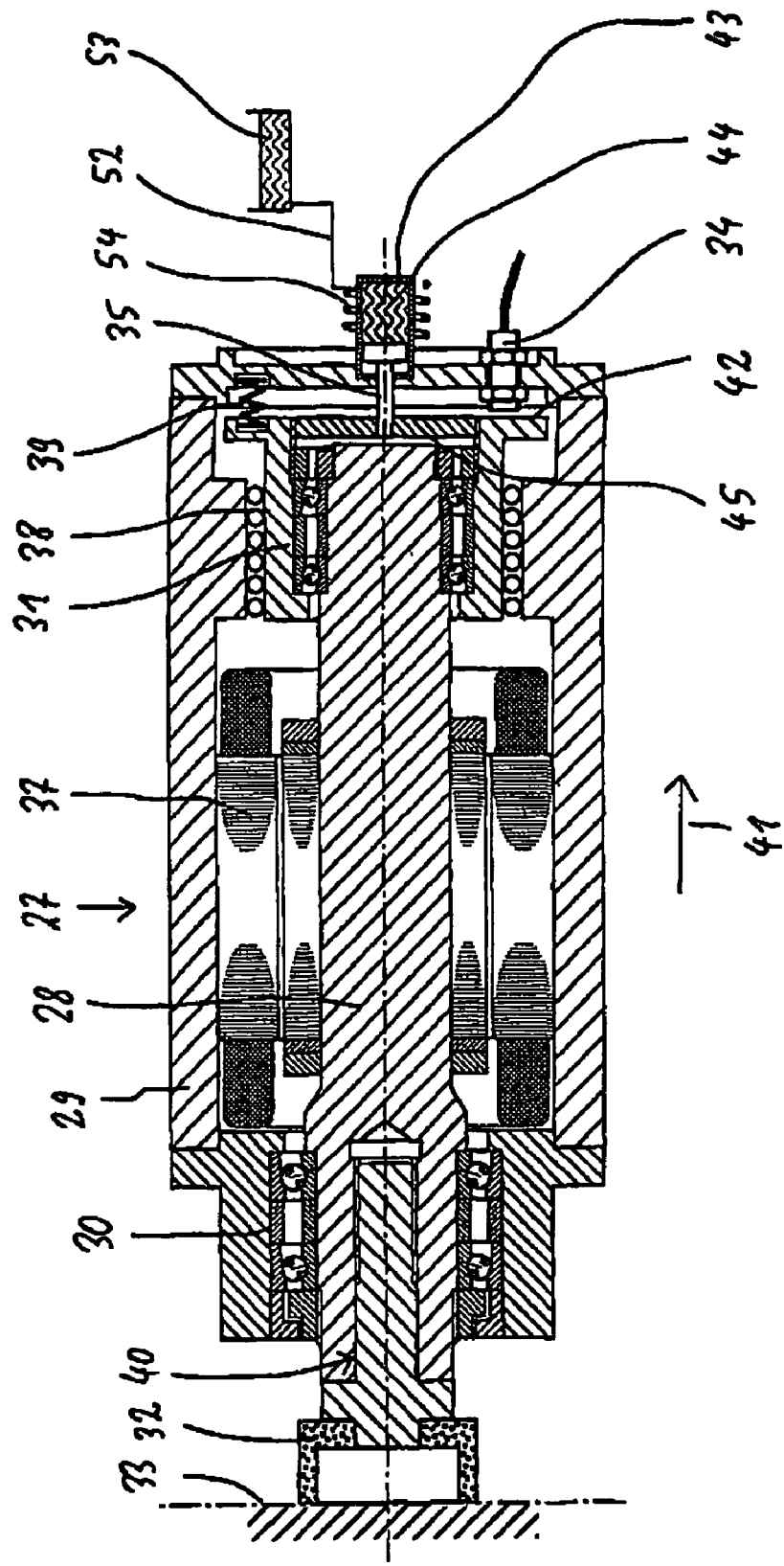
Figure 4:
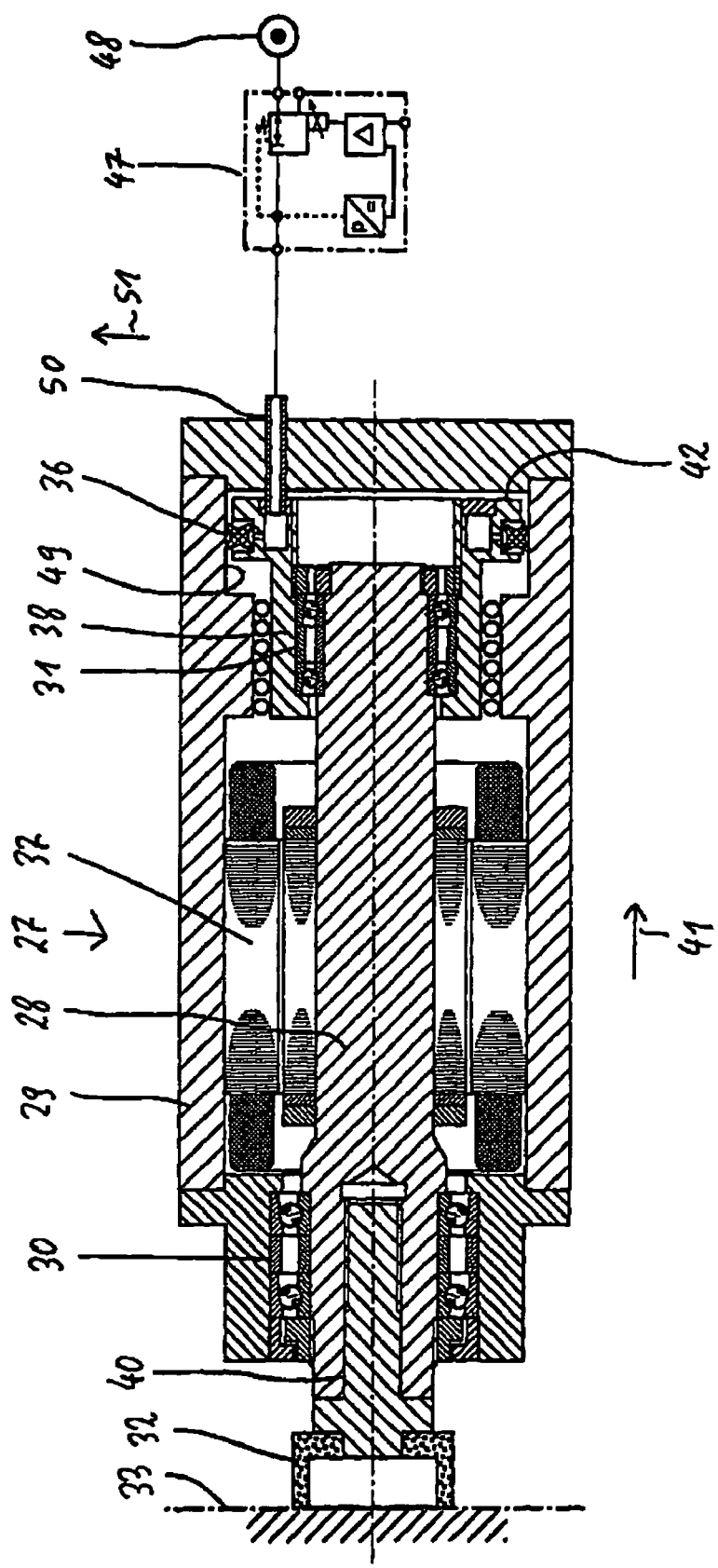

The second implementation of the invention is explained in more detail by means of exemplary embodiments in the further drawing figures in which:

FIG. 2 shows a motor spindle in longitudinal section with a first embodiment of an actuating element, FIG. 3 shows a motor spindle in longitudinal section with a second embodiment of an actuating element, and FIG. 4 shows a motor spindle in longitudinal section with a third embodiment of an actuating element.

FIG. 2 shows a motor spindle 27 in longitudinal section, with a spindle shaft 28 and a housing 29. The spindle shaft 28 is driven via the drive 37 known per se. Furthermore, the spindle shaft 28 is received in a fixed mounting 30 and a loose mounting 31 in the housing 29. In this case, the fixed mounting 30 and the loose mounting 31 are prestressed relative to one another via a force-loaded bearing bush 38. The action of force on the bearing bush 38 may take place by means of a spring element 39, hydraulically, pneumatically and/or magnetically. The tool 32 (for example, a cup-type grinding wheel), which is in engagement with the workpiece 33 (for example, a silicon surface), is received on the spindle shaft 28 in a chucking system 40 illustrated diagrammatically.

An actuating element designed as a piston 35 may be gathered, furthermore, from FIG. 2. The piston 35 is received in a cylinder 43 having, for example, a fluid 44. By the action of pressure on the fluid 44, the piston 35 can be displaced opposite to the direction 41, an axial force opposite to the direction 41 being introduced into the bearing bush 38 and consequently into the loose mounting 31 of the motor spindle 27 via a transmission element 45 of the piston 35, said transmission element being connected to the bearing bush 38. The axial rigidity (prestress) of the motor spindle 27 is thereby increased.

By a reduction in pressure in the cylinder 43, the axial rigidity of the motor spindle 27 can be reduced by action in the opposite direction for the applications already described. The cylinder 43 may be connected via a valve 46 to a control 47, illustrated in general terms, and known per se, and to a pressure source 48.

FIG. 3 shows an actuating element according to FIG. 1, the fluid 44 being electrorheological or magnetorheological, and its viscosity being varied by action upon it by changing electrical or magnetic fields of, for example, a coil 54. The cylinder 43 is connected to a tank 53 via a connection 52. When the viscosity of the fluid 44 changes, its flow behavior and consequently the displaceability of the piston 35 and of the actuating element change.

During the workpiece change, the motor spindle 27 is moved away from the workpiece 33 in the direction 41 via the feed element (not shown in any more detail) known per se, and the workpiece 33 can be removed and a new workpiece 33 introduced. The motor spindle 27 is subsequently moved in the direction of the workpiece 33 again opposite to the direction 41. When the contacting of the tool 32 with the new workpiece 33 occurs, that is to say the state shown in FIGS. 2, 3 and 4 is obtained, this bump-like loading of the spindle shaft 28 is detected by the travel sensor 34.

The travel sensor 34 determines a bump-like loading of the spindle shaft 28 in the axial direction (parallel to the direction 41). In this case, the travel sensor 34 can monitor a distance from a reference surface 42 of the bearing bush 38, known per se, of the loose mounting 31. After the detection of the bump-like loading of the spindle shaft 28 in the axial direction 41, the feed of the motor spindle 27 is changed over from rapid motion to work motion opposite to the direction 41. The travel sensor 34 is in this case connected, in a way known per se and not shown in any more detail, to an element for controlling the feed element.

FIG. 4 shows a further alternative embodiment of the actuating element as an expandable (elastic) annular element 36 which peripherally contacts an inner surface 49 of the housing 29 of the motor spindle 27.

The travel sensor 34 is in this case not shown in any more detail, but may be provided in a similar way to the embodiment according to FIG. 2. Furthermore, the annular element 36 is received in the bearing bush 38 and is acted upon by pressure via a supply 50, in such a way that an expansion of the annular element 36 in the direction 41 takes place, with the result that the annular element 36 is pressed against the inner surface 49 and consequently frictional forces occur between the inner surface 49 and the annular element 36 which make it difficult for the bearing bush 38 to be displaced in or opposite to the direction 51.

In the event of a reduction in pressure in the supply 50 via a control 47 and a pressure source 48, the frictional forces between the annular element 36 and the inner surface 49 are reduced. The bearing bush 38 can consequently be moved more easily.

REFERENCE SYMBOLS

1 Motor spindle
2 Spindle housing
3 Drive
4 Spindle shaft
5 Fixed mounting
6 Loose mounting
7,8,9,10 Bearing element
11 Bearing bush
12 Spring element
13 Tie rod
14 Tool
15 Workpiece
16 Tool interface
17,18 Bearing body
19 Travel sensor
20 Displacement direction
21 Reference surface
22 Opposite direction
23 Travel sensor
24 Reference surface
25 Outer ring
26 Piston element
27 Motor spindle
28 Spindle shaft
29 Housing
30 Fixed mounting
31 Loose mounting
32 Tool
33 Workpiece
34 Travel sensor
35 Piston
36 Annular element
37 Drive
38 Bearing bush
39 Spring element
40 Chucking system
41 Direction
42 Reference surface
43 Cylinder
44 Fluid
45 Transmission element
46 Valve
47 Control
48 pressure source
49 Inner surface
50 Supply
51 Direction
52 Connection
53 Tank
54 Coil

The invention claimed is:

1. A motor spindle having an axis with a spindle shaft for receiving a tool, the spindle shaft being received in a housing of the motor spindle in a fixed mounting and a loose mounting by means of an axially displaceable bearing bush, and the received tool contacting a machined workpiece at a tool interface when the spindle shaft is driven, and
an actuating element for setting the axial displaceability of the bearing bush (38) of the motor spindle (27) is provided;
wherein the actuating element has a piston (35);
wherein a cylinder (43) for actuating the piston (35) is provided; and
wherein the cylinder (43) is filled with an electrorheological or magnetorheological fluid (44).

2. The motor spindle as claimed in claim 1, wherein a coil (54) for varying the viscosity of the fluid (44) is provided.

3. The motor spindle as claimed in claim 1 wherein there is at least one motion for the accelerated movement of the tool (32) with respect to the workpiece and at least one work motion for another movement of the tool (32) with respect to the workpiece (33).

4. The motor spindle as claimed in claim 1, wherein a travel sensor (34) for determining the point in time of contacting of the tool (32) with the workpiece (33) in the event of a tool change is provided.

5. A method for setting the axial displaceability of a bearing bush of a loose mounting of a motor spindle with a spindle shaft,
wherein the motor spindle has an axis with the spindle shaft for receiving a tool, the spindle shaft being received in a housing of the motor spindle in a fixed mounting and the loose mounting by means of the axially displaceable bearing bush, and the received tool contacting a machined workpiece at a tool interface when the spindle shaft is driven, and
an actuating element for setting the axial displaceability of the bearing bush (38) of the motor spindle (27) is provided;
wherein the actuating element has a piston (35);
wherein a cylinder (43) for actuating the piston (35) is provided;
and wherein the cylinder (43) is filled with an electrorheological or magnetorheological fluid (44); and
wherein the axial displaceability of the bearing bush of the motor spindle is set via the actuating element.

6. The method as claimed in claim 5, wherein when the tool is being moved up to the workpiece, the spindle shaft of the motor spindle has rigidity.

7. The method as claimed in claim 5, wherein there is rigidity of the spindle shaft of the motor spindle during the contacting of a moved-up tool with the workpiece.

* * * * *